(12) United States Patent
Qiu

(10) Patent No.: US 11,210,551 B2
(45) Date of Patent: Dec. 28, 2021

(54) ITERATIVE MULTI-DIRECTIONAL IMAGE SEARCH SUPPORTING LARGE TEMPLATE MATCHING

(71) Applicant: Hong Kong Applied Science and Technology Research Institute Co., Ltd., Shatin (HK)

(72) Inventor: Tian Qiu, Hong Kong (CN)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 174 days.

(21) Appl. No.: 16/524,802

(22) Filed: Jul. 29, 2019

(65) Prior Publication Data

US 2021/0034911 A1 Feb. 4, 2021

(51) Int. Cl.
*G06K 9/00* (2006.01)
*G06K 9/62* (2006.01)
(Continued)

(52) U.S. Cl.
CPC ......... *G06K 9/6203* (2013.01); *G06F 16/535* (2019.01); *G06F 16/56* (2019.01);
(Continued)

(58) Field of Classification Search
USPC ........................................ 382/277, 216, 100
See application file for complete search history.

(56) References Cited

U.S. PATENT DOCUMENTS

| 4,669,054 A * | 5/1987 | Schlunt | G06E 3/005 |
| | | | 359/561 |
| 5,293,429 A * | 3/1994 | Pizano | G06K 9/00442 |
| | | | 382/202 |

(Continued)

FOREIGN PATENT DOCUMENTS

| CN | 101996398 A | 3/2011 |
| CN | 102036094 A | 4/2011 |

(Continued)

OTHER PUBLICATIONS

International Search Report and Written Opinion issued for PCT Application No. PCT/CN2019/099670, dated Apr. 24, 2020, 10 pages.

(Continued)

*Primary Examiner* — Kathleen Y Dulaney
(74) *Attorney, Agent, or Firm* — Norton Rose Fulbright US LLP

(57) ABSTRACT

Systems and methods which provide iterative multi-directional image searching are described. Embodiments utilize a multi-directional searching pattern for defining one or more searching areas within a source image. A searching area of embodiments provides a searching area within a source image for searching for a template image in the multiple directions of the multi-directional searching pattern. A location of the searching area within the source image may be updated iteratively, such as based upon motion vectors derived from the searching, until a template image match position is identified within the source image. Embodiments (Continued)

transform the template image and the searching area within a source image to 1D representations corresponding to each direction of the multi-directional image search. Embodiments accommodate rotation and scale variance of the subject (e.g., object of interest) of the template image within the source image.

27 Claims, 10 Drawing Sheets

(51) Int. Cl.
*G06T 3/40* (2006.01)
*G06F 16/535* (2019.01)
*G06T 3/60* (2006.01)
*G06F 16/56* (2019.01)
*G06T 3/00* (2006.01)

(52) U.S. Cl.
CPC ............. *G06T 3/0056* (2013.01); *G06T 3/40* (2013.01); *G06T 3/60* (2013.01)

(56) References Cited

U.S. PATENT DOCUMENTS

| | | | | |
|---|---|---|---|---|
| 5,682,208 | A * | 10/1997 | Harney | H04N 5/145 348/416.1 |
| 6,002,800 | A * | 12/1999 | Donelly | H04N 1/00848 382/216 |
| 6,249,608 | B1 * | 6/2001 | Ikeda | G06T 7/20 382/209 |
| 6,272,247 | B1 | 8/2001 | Manickam et al. | |
| 6,603,882 | B2 | 8/2003 | Oh et al. | |
| 6,640,008 | B1 | 10/2003 | Lee et al. | |
| 6,671,399 | B1 * | 12/2003 | Berestov | G06K 9/209 345/419 |
| 7,492,490 | B2 * | 2/2009 | Silverbrook | G06K 1/121 358/474 |
| 7,738,700 | B2 * | 6/2010 | Shiiyama | G06T 7/30 382/170 |
| 8,804,826 | B2 * | 8/2014 | Zan | H04N 19/154 375/240.12 |
| 9,740,919 | B1 * | 8/2017 | Balasubramanian | G06K 9/00986 |
| 2004/0081360 | A1 * | 4/2004 | Lee | G06K 9/6857 382/209 |
| 2004/0091144 | A1 * | 5/2004 | Call | G06K 9/6253 382/159 |
| 2005/0190972 | A1 * | 9/2005 | Thomas | G06K 9/209 382/218 |
| 2005/0283307 | A1 * | 12/2005 | Siah | G06T 7/20 250/208.1 |
| 2007/0098075 | A1 * | 5/2007 | Ohgose | H04N 19/61 375/240.16 |
| 2009/0010530 | A1 * | 1/2009 | Sumitomo | G06T 7/593 382/154 |
| 2009/0080767 | A1 * | 3/2009 | Boughorbel | G06T 7/55 382/154 |
| 2011/0033120 | A1 * | 2/2011 | Sezaki | G09G 5/08 382/203 |
| 2011/0150280 | A1 * | 6/2011 | Tsuji | G06T 7/248 382/103 |
| 2014/0064623 | A1 * | 3/2014 | Kang | G06K 9/3233 382/195 |
| 2014/0355892 | A1 * | 12/2014 | Moon | G06K 9/6215 382/220 |
| 2015/0154470 | A1 * | 6/2015 | Oh | G06K 9/629 382/209 |
| 2015/0163432 | A1 * | 6/2015 | Tsuchida | G06K 9/00973 348/302 |
| 2018/0107884 | A1 | 4/2018 | Kinoshita et al. | |
| 2019/0272411 | A1 | 9/2019 | Zou et al. | |

FOREIGN PATENT DOCUMENTS

| | | |
|---|---|---|
| CN | 104036290 A | 9/2014 |
| CN | 106936964 A | 7/2017 |
| KR | 101192162 B1 | 10/2012 |

OTHER PUBLICATIONS

Sun, L. et al. "Fast LED Chip Position Technique Base on Template Projection Matching," Microcomputer Information, vol. 25, Dec. 2009; 3 pages.

Chen, Z. et al. "Iterative Template Matching with Rotation Invariant Best-Buddies Pairs" Proceedings CCF Chinese Conference on Computer Vision, Springer, Oct. 2017, 11 pages.

Paramkusam, A. et al. "A Three-Point Directional Search Block Matching Algorithm" International Journal of Electrical and Computer Engineering, vol. 7, No. 1, Feb. 2017, 8 pages.

Toyama, F. et al. "Fast Template Matching Using Brick Partitioning and Initial Threshold" 23rd International Conference on Pattern Recognition, IEEE, Dec. 2016, 5 pages.

Jou, S.-Y. et al. "Fast Motion Estimation Algorithm and Design for Real Time QFHD High Efficiency Video Coding" IEEE Transactions on Circuits and Systems for Video Technology, vol. 25, No. 9, Sep. 2015, 12 pages.

Zhu, C. et al. "Hexagon-Based Search Pattern for Fast Block Motion Estimation" IEEE Transactions on Circuits and Systems for Video Technology, vol. 12, No. 5, May 2002, 7 pages.

\* cited by examiner

ITERATIVE MULTI-DIRECTIONAL IMAGE SEARCH SUPPORTING LARGE TEMPLATE MATCHING

TECHNICAL FIELD

The present invention relates generally to image searching and, more particularly, to iterative multi-directional image searching supporting large template matching.

BACKGROUND OF THE INVENTION

Various techniques have been used for identifying portions of interest within an image. For example, template matching techniques are known in digital image processing for finding small portions within a digital source image scene (referred to herein as a "source image") corresponding to a digital reference image template (referred to herein as a "template image"). Such techniques may, for example, be implemented in various manufacturing systems for defect inspection, in video compression systems for motion estimation, etc.

In operation, a template matching technique attempts to locate the position of a template image within a larger source image by matching the template image to a portion of the source image. As such, template matching techniques typically scan a source image pixel by pixel and perform a comparison of a template mage to estimate a location of the template image within the source image. The full search (FS) template matching method exhaustively evaluates all possible candidate locations within a search area in the source image. It can readily be appreciated that the exhaustive search of FS template matching is very computationally intensive and can consume appreciable computational power. Normalized grayscale correlation may be used for comparing the grayscale value relative to their positions in both the template image and the source image. Pyramiding may be utilized to reduce the number of pixels. The hexagon search method uses two different sizes of hexagonal search patterns, of which the larger search pattern consisting of 7 check points is for coarse search, and the smaller shrunk hexagonal pattern consisting of 4 check points is for fine search. The Hexagon search method decreases the total check points, and thus makes the template searching process faster. However, the use of normalized grayscale correlation and an image pyramid are computationally very expensive, particularly when the template image is relatively large, since every pixel in the template image needs to be correlated with every pixel in the source image, while the hexagon search may fall in the trap of a local best match but not a global best match.

A template image having a width or height that is ⅓ of the search range (i.e., the area of within a source image to be searched) or greater is defined herein as a large template. Accordingly, a large template is relatively large compared with the search range. Although the use of such large templates in the traditional template matching techniques exasperates the computationally expensive nature of those techniques, the use of such large templates is nevertheless common. For example, large template matching can be part of a coarse-fine matching process, such as may be used in video compression, image registration, object localization, shape defect inspection, and stereo matching. In a common situation, the coarse location of an object within an image is known, but the accurate location the object within the image is needed. In this situation, the search range within the source image is relatively small and use of a template matching technique presents a large template search issue. Conventional template matching techniques are computationally intensive, especially for such large templates, and thus are generally time consuming to search for a best template match in these situations.

As an example of a large template situation, a template image size may be 64×84 pixels while the search range size may be 177×236 pixels. In this example, the correlation (search) matrix size is 114×153 (i.e., (177−64+1)×(236−84+1), wherein the borders of the template image are constrained to be all inside the source image), and the computation count is (114×153)×(64×84)=93,768,192 units. It can be seen from this example that template matching in a large template situation is very computationally expensive.

In addition to being computationally expensive, existing template matching techniques commonly present issues with respect to the accuracy of the results provided. For example, conventional template matching techniques often provide a local optimum, but not a global optimum value, which decreases the precision/accuracy rate. Moreover, conventional template matching techniques generally result in out of edge pixels in the template matching which affects the accuracy of the results.

BRIEF SUMMARY OF THE INVENTION

The present invention is directed to systems and methods which provide iterative multi-directional image searching. Iterative multi-directional image search techniques implemented in accordance with concepts of the present invention support large template matching, enabling fast and accurate matching of template images (e.g., as may comprise one or more objects of interest) within source images even in large template situations. An iterative multi-directional image search implemented in accordance with concepts of the present invention provide template matching, even in a large template situation, in a computationally efficient multidirectional search process that provides a high accuracy rate of the matching result.

Embodiments of an iterative multi-directional image search utilize a multi-directional searching pattern for defining one or more searching areas within a source image. A searching area of embodiments provides a searching area within a source image for searching for a template image in the multiple directions of the multi-directional searching pattern. For example, embodiments may utilize one or more cross searching pattern to identify a cross searching area within the source image, such as may comprise a first directional search portion (e.g., horizontal search portion) and a second search portion (e.g., vertical search portion) which cross one another, wherein searching for the template images is performed in the searching area along the multiple directions of the multi-directional searching pattern. A location of the searching area within the source image may be updated iteratively, such as based upon motion vectors derived from the searching, until a template image match position is identified within the source image. The directionally defined searching area and corresponding multi-directionally based template image searching implemented according to embodiments of the invention facilitates efficient searching within the source image, wherein the iterative updating of the searching area enables efficient convergence on the template image match position within the source image.

To facilitate highly efficient searching within the source image, embodiments of an iterative multi-directional image search transforms the template image and the searching area within a source image to 1-dimensional (1D) representations corresponding to each direction of the multi-directional image search. For example, image data for the template image and multi-directional image searching area within the source image may be transformed from the 2-dimensional (2D) domain to 1D representations using summation, fast Fourier transform (FFT), or other transformation techniques for representing the image data 1-dimensionally. Where a cross searching area comprises a horizontal search portion and a vertical search portion, for example, embodiments may transform the template image to a 1D representation for the horizontal direction and a 1D representation for the vertical direction. Similarly, the cross searching area of the source image may be transformed to a 1D representation for the horizontal direction and a 1D representation for the vertical direction. Searching for the template image may thus be performed in the searching area along the multiple (e.g., vertical and horizontal) directions of the multi-directional searching pattern by correlating the appropriate 1D representations of the template image and the searching area within the source image.

An iterative multi-directional image search of embodiments accommodates rotation and scale variance of the subject (e.g., object of interest) of the template image within the source image. For example, the template image may be rotated in multiple orientations (e.g., 45°, 90°, 135°, 180°, 225°, 270°, 315°, etc.) and/or scaled (e.g., 75%, 100%, 150%, etc.), wherein the multiple oriented and/or scaled instances of the template are searched in the searching area within a source image in the multiple directions. Embodiments of the interactive multi-directional image search may transform each such multiple oriented instance and/or scaled instance of the template image for performing multi-directional image searching as discussed above.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying drawings, in which.

DETAILED DESCRIPTION OF THE INVENTION

Figure 1A:
FIG. 1A shows an example template image as may be utilized in iterative multi-directional image searching of embodiments of the present invention.
Figure 1B:
FIG. 1B shows an example source image as may be utilized in iterative multi-directional image searching of embodiments of the present invention.
Figure 1C:
FIG. 1C shows a determined position of the example template image within the example source image as may be provided by iterative multi-directional image searching of embodiments of the present invention.

An iterative multi-directional image search in accordance with concepts of the present invention may be implemented for identifying one or more template image within a source image, such as for quality control, defect inspection, motion estimation, image registration, object localization, stereo matching, autonomous vehicle navigation, etc. For example, iterative multi-directional image searching according to embodiments may use a predetermined template image (e.g., template image 110 of FIG. 1A) with respect to one or more source images (e.g., source image 120 of FIG. 1B) to determine a position of an object or other portion of interest within the source image(s) (e.g., position 130 of FIG. 1C), such as to provide matched pattern information output for use by various systems.

Figure 2:
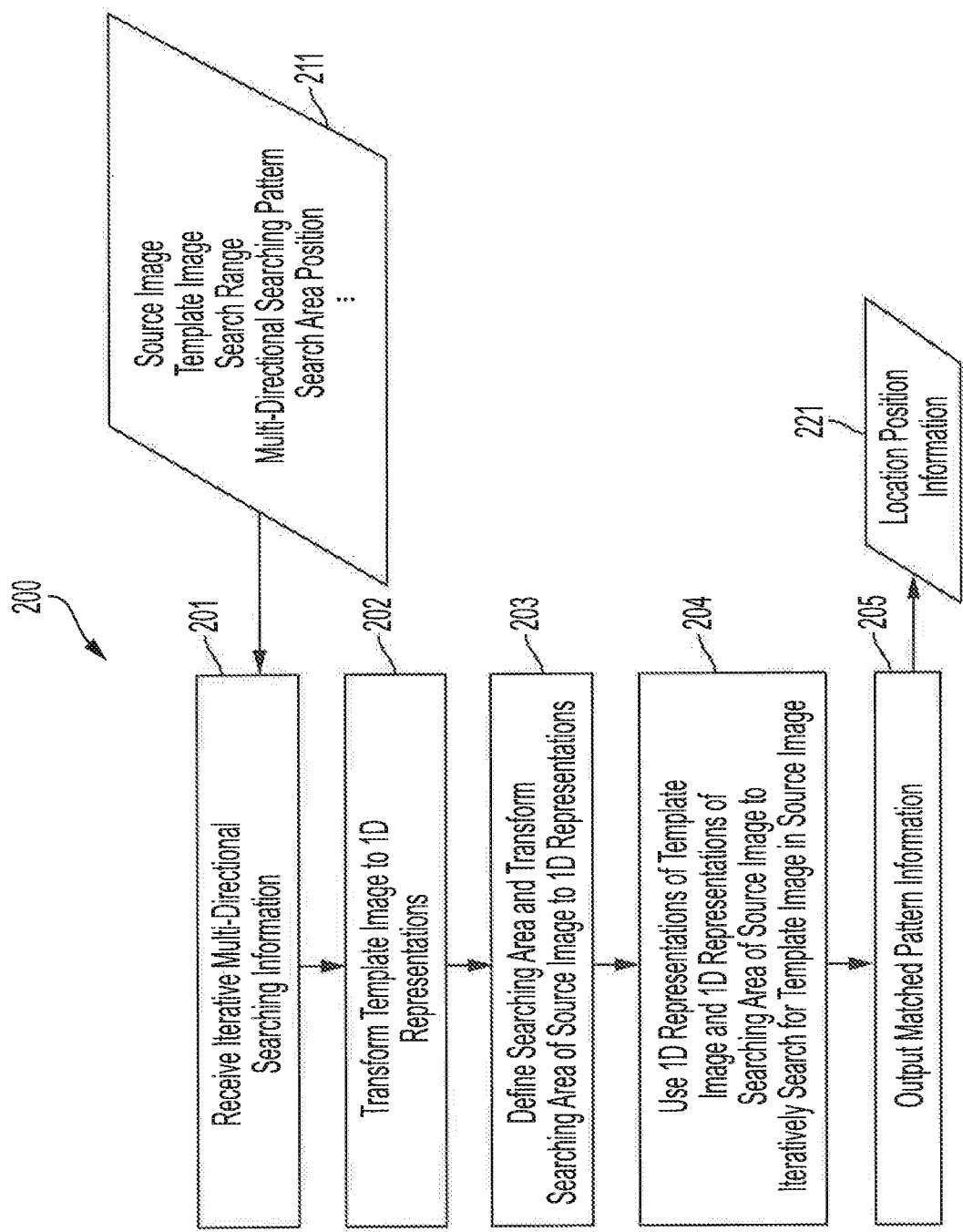
FIG. 2 shows a flow diagram of iterative multi-directional image searching operation according to embodiments of the present invention.

FIG. 2 shows a flow diagram (shown as flow 200) of iterative multi-directional image searching operation according to embodiments of the present invention. It should be appreciated that, when implemented in software, the functions of flow 200 providing iterative multi-directional image searching of the present invention may comprise code segments to perform the tasks as described herein. The code segments can be stored in a processor readable medium for execution by one or more processors of a processor-based system. The processor readable medium may include any medium that can suitably store and transfer information. Examples of the processor readable medium include an electronic circuit, a semiconductor memory device, a read only memory (ROM), a flash memory, an erasable ROM (EROM), an optical disk, a hard disk, etc. The code segments may be downloaded via computer networks such as a local area network (LAN), a wide area network (WAN), the Internet, an intranet, a cellular communication network, etc.

Figure 3:
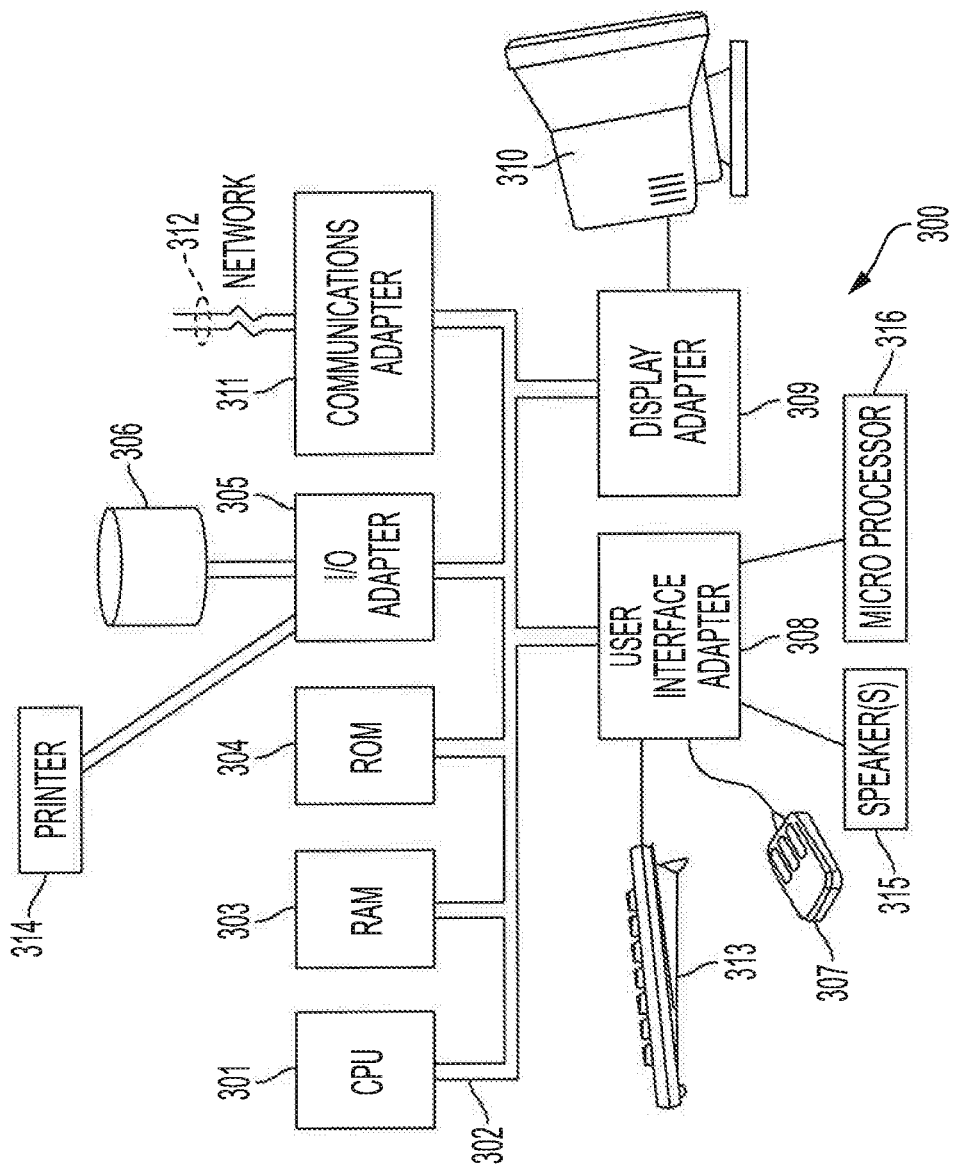
FIG. 3 shows a processor-based system configured for iterative multi-directional image searching operation according to embodiments of the present invention.

FIG. 3 processor-based system 300 (e.g., server system, personal computer system, notebook computer system, tablet system, smartphone system, etc.) configured to implement iterative multi-directional image searching according to embodiments of the present invention. In the illustrated embodiment of processor-based system 300, central processing unit (CPU) 301 is coupled to system bus 302. CPU 301 may comprise a general purpose CPU, such as a processor from the CORE family of processors available from Intel. Corporation, a processor from the ATHLON family of processors available from Advanced. Micro Devices, Inc., a processor from the POWERPC family of processors available from the AIM Alliance, etc. However, the present invention is not restricted by the architecture of CPU 301 as long as CPU 301 supports the inventive operations as described herein. For example, CPU 301 of embodiments may comprise one or more special purpose processors, such as an application specific integrated circuit (ASIC), a graphics processing unit (GPU), a field programmable gate array (FPGA), etc. Bus 302 couples CPU 301 to random access memory (RAM) 303 (e.g., SRAM, DRAM, SDRAM, etc.) and ROM 304 (e.g., PROM, EPROM, EEPROM, etc.). RAM 303 and ROM 304 hold user and system data and programs, such as may comprise some or all of the aforementioned program code for performing functions of multi-directional image searching and data associated therewith.

Bus 302 of the illustrated embodiment of processor-based system 300 is also coupled to input/output (I/O) controller 305, communications adapter 311, user interface adapter 308, and display adapter 309. I/O controller 305 couples to storage device 306 (e.g., one or more of a hard drive, optical drive, solid state drive, etc.), to CPU 301 and RAM 303, such as to exchange program code for performing functions of multi-directional image searching and/or data associated therewith. I/O adapter 305 of the illustrated embodiment is also connected to printer 314 (e.g. dot matrix printer, laser printer, ink jet printer, thermal printer, etc.), which would allow the system to print paper copies of information such as matched pattern information and/or other information and documents. Communications adapter 311 is configured to couple processor-based system 300 to network 312 (e.g., a cellular communication network, a LAN, WAN, the Internet, etc.). User interface adapter 308 of the illustrated embodiment couples user input devices, such as keyboard 313, pointing device 307, and microphone 316, to other components of processor-based system 300. User interface adapter 308 of the illustrated embodiment also provides sound output to a user via speaker(s) 315. Display adapter 309 is driven by CPU 301 to control the display on display device 310 (e.g., flat panel display, touch screen, heads-up display, holographic projector, etc.).

Referring again to FIG. 2, multi-directional image searching operation of flow 200 of the illustrated embodiment begins by receiving iterative multi-directional searching information 211 at block 201. For example, one or more template images (e.g., template image 110 of FIG. 1A) and one or more source images (e.g., source image 120 of FIG. 1B) may be provided to processor-based system 300 for use with respect to multi-directional image searching according to concepts of the present invention. The source image(s) as provided to processor-based system 300 may, for example, comprise a single digital image of a scene of interest, a stream of digital images of a moving view or captured motion image, etc. The template image(s) as provided to processor-based system 300 may, for example, comprise one or more digital images of an object or other predetermined item of interest to be identified in the source image(s). It can be appreciated from the illustrated embodiment of flow 200 that the iterative multi-directional searching information received by processor-based system 300 may comprise information in addition to source and template images. For example, various information useful in implementing multi-directional image searching according to the concepts herein, such as search range information, multi-directional searching pattern information, search area position information, etc., may be received at block 201 of embodiments.

Operation at block 201 of embodiments may include various functions in addition to the aforementioned receiving of the receiving iterative multi-directional searching information 211. For example, operations to process and/or store some or all of the receiving iterative multi-directional searching information may be performed, such as to provide pre-processing (e.g., filtering, smoothing, resizing, registering, etc.) with respect to the template image and/or source image.

At block 202 of flow 200 shown in FIG. 2, the illustrated embodiment of iterative multi-directional image search operation transforms the template image to 1D representations. In operation according to embodiments of the invention, the template image is transformed to 1D representations for each direction of the multi-directional image search by logic of processor-based system 300. For example, image data for template image 110 may be transformed from the 2D domain to 1D representations using summation (e.g., summation of median or average pixels along a direction of the multi-directional search), FFT (e.g., discrete Fourier transform of pixels along a direction of the multi-directional search), or other transformation techniques for representing the image data 1-dimensionally (e.g., 1D vector).

Figure 4A:
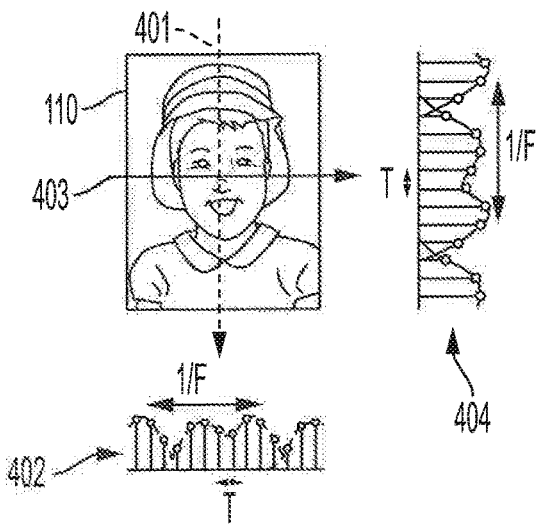
FIG. 4A shows an example of generation of 1D representations of the template image where the multi-directional search comprises horizontal and vertical directions.

FIG. 4A shows an example in which the multi-directional search comprises horizontal and vertical directions. Accordingly, transforming template image 110 to a 1D representation for the horizontal direction (e.g., a first direction of the multi-directional search) may comprise applying a transformation technique (e.g., summation, FFT, etc.) to each pixel of a horizontal row of pixels in the template image. The transformation technique may be likewise applied with respect to each row of pixels forming the template image (as represented by arrow 401 sequentially traversing each row of pixels) and the combined result (e.g., a horizontal pixel 1D vector derived from the horizontal pixel row data, such as shown in graph 402 having a data point (e.g., magnitude) for each horizontal row of pixels in the template image) used for representing the image data 1-dimensionally. Similarly, transforming template image 110 to a 1D representation for the vertical direction (e.g., a second direction of the multi-directional search) may comprise applying a transformation technique (e.g., summation, FFT, etc.) to each pixel of a vertical column of pixels in the template image. The transformation technique may be likewise applied with respect to each column of pixels forming the template image (as represented by arrow 403 sequentially traversing each column of pixels) and the combined result (e.g., a vertical pixel 1D vector derived from the vertical pixel column data, such as shown in graph 404 having a data point (e.g., magnitude) for each vertical column of pixels in the template image) used for representing the image data 1-dimensionally. In the illustrated example, the horizontal/vertical pixel 1D vectors comprise a vector having information (e.g., summation of median or average pixel values, FFT of the pixels, etc.) for each row/column of the template image to thereby provide a substantially unique 1D representation of the template image for each direction of the multi-directional search. It should be appreciated that the same or different transformation techniques may be utilized in the different direction transformations (e.g., the transformation of the first direction of the multi-directional search may use a first transformation technique and the second direction of the multi-directional search may use the first or a second transformation technique).

Figure 4B:
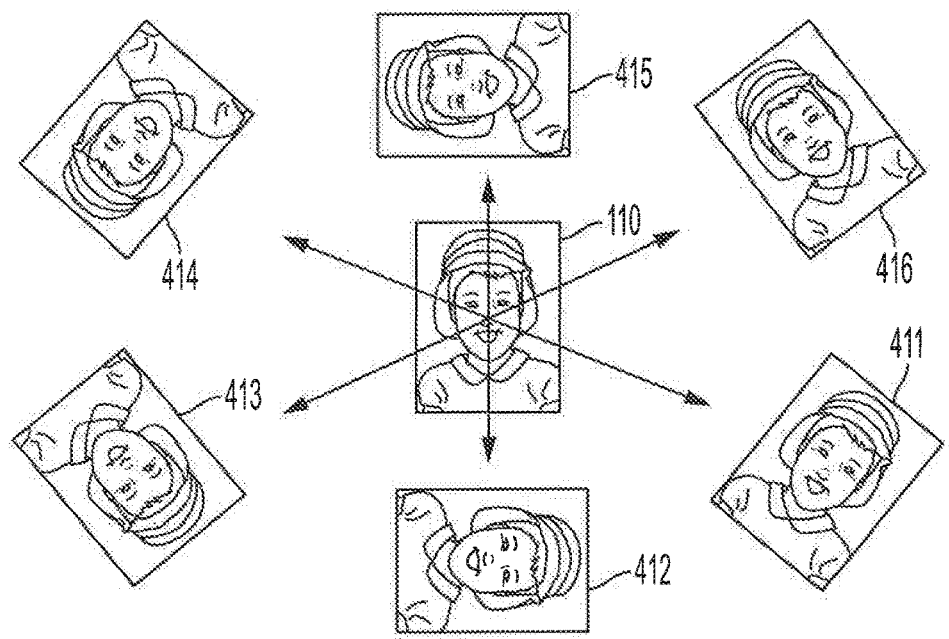
FIG. 4B shows an example of configuration of iterative multi-directional image searching for rotation variance of an object of the template image within the source image according to embodiments of the present invention.
Figure 4C:
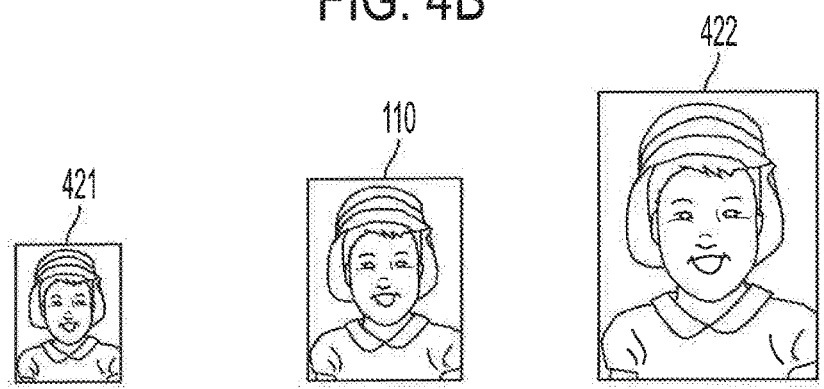
FIG. 4C shows an example of configuration of iterative multi-directional image searching for scale variance of an object of the template image within the source image according to embodiments of the present invention.

An iterative multi-directional image search of embodiments of the invention is configured to accommodate rotation and/or scale variance of the subject (e.g., object of interest) of the template image within the source image. Accordingly, processing at block 202 may operate to rotate the template image in multiple orientations (e.g., 45°, 90°, 135°, 180°, 225°, 270°, 315°, etc.) for use in determining the location of an object of interest within the source image when the object has changed relative orientation. For example, the embodiment shown in FIG. 4B illustrates rotation of template image 110 rotated 45° (rotated template image 411), 90° (rotated template image 412), 135° (rotated template image 413), 225° (rotated template image 414), 270° (rotated template image 415), and 31.5° (rotated template image 416), in addition to the original orientation of template image 110. Additionally or alternatively, processing at block 202 may operate to scale the template image in multiple scales (e.g., 75%, 100%, 150%, etc.) for use in determining the location of an object of interest within the source image when the object has changed relative size. For example, the embodiment shown in FIG. 4C illustrates scaling of template image 110 scaled 75% (scaled template image 421) and 150% (scaled template image 422), in addition to the original scaling of template image 110.

In operation according block 202 of embodiments, wherein template image rotation and/or scaling is provided, each of the multiple oriented instances of the template image (e.g., rotated template images 411-414) and the multiple scaled instances of the template image (e.g., scaled template images 421-422) are transformed to 1D representations, as described above with respect to template image 110. For example, transforming the rotated template images and the scaled template images each to a respective 1D representation for the horizontal direction (e.g., a first direction of the multi-directional search) may comprise applying a transformation technique (e.g., summation, FFT, etc.) to each pixel of a horizontal row of pixels in the particular instance of the rotated/scaled template images. The transformation technique may be likewise applied with respect to each row of pixels forming the particular instance of the rotated/scaled template image and the combined result (e.g., a horizontal pixel 1D vector) used for representing the particular instance of image data 1-dimensionally. Similarly, transforming the rotated template images and the scaled template images each to a respective 1D representation for the vertical direction (e.g., second direction of the multi-directional search) may comprise applying a transformation technique (e.g., summation, FFT, etc.) to each pixel of a vertical column of pixels in the particular instance of the rotated/scaled template images. The transformation technique may be likewise applied with respect to each column of pixels forming the particular instance of the rotated/scaled template image and the combined result (e.g., a vertical pixel 1D vector) used for representing the particular instance of image data 1-dimensionally.

At block 203 of the illustrated embodiment of flow 200, a searching area is defined with respect to source image 120 for use in iteratively searching within the source image using the template image, as described further below. To facilitate searching of the searching area using the 1D representations of template image 110, embodiments of the invention correspondingly transform the searching area of source image 120 to 1D representations, also as described further below. In operation according to embodiments, the searching area of the source image is transformed to 1D representations for each direction of the multi-directional image search by logic of processor-based system 300 using the same transformation technique(s) (e.g., summation, FFT, etc.) used for transforming the template image. It should be appreciated that, in operation according to embodiments, the transformation technique utilized for a particular direction of the multi-directional search with respect to the template image is the same transformation technique utilized for that direction of the multi-directional search with respect to the searching area.

Operation to define a searching area according to embodiments may utilize various parameters and/or other information, such as may be predetermined and/or as otherwise may be determined with respect to any particular implementation. For example, search range information, multi-directional searching pattern information, search area position information, etc. utilized by logic of processor-based system 300 in defining a searching area for iterative multi-directional image searching (e.g., as may be provided to processor-based system 300 in iterative multi-directional searching information 211) may be provided by a user or system for which iterative multi-directional image searching is performed. Additionally or alternatively, search range information, multi-directional searching pattern information, search area position information, etc. utilized by logic of processor-based system 300 in defining a searching area for iterative multi-directional image searching may be computed or otherwise determined by processor-based system 300, such as using other information provided thereto, machine learning techniques, etc.

Embodiments of iterative multi-directional searching utilize a search range (e.g., search range 500 of FIG. 5) to establish an area within the source image to be searched for the template image. The search range is preferably sized to encompass an area in which an object of interest represented in the template image is likely to be found, while possibly being smaller than the source image to reduce the amount of processing performed for searching, as shown by search range 500 defined within source image 120 in FIG. 6. The search range may, for example be larger where an object of interest is expected to move relatively quickly within a series of moving images comprising the source images, where uncertainty regarding the possible location of an object of interest is relatively high, where the object of interest itself (and thus the template image) is relatively large, etc. In contrast, the search range may be smaller where an object of interest is expected to move slowly or even remain relatively stationary within a series of moving images comprising the source images, where certainty regarding the possible location of an object of interest is relatively high, where the object of interest itself (and thus the template image) is relatively small, etc.

In operation to define a searching area, embodiments of the present invention may calculate or otherwise identify a center (Cx, Cy) for the search range. This search range center information may be utilized to position the search range with respect to the source image and thus define an area of the source image to be searched. In operation according to embodiments of the invention, search range center information may be utilized to center the search range with respect to a search area position identified for the source image. For example, the search area position location for the source image may be determined as the center of source image 120, such as to accommodate searching for template image 110 throughout the source image (e.g., where a likely position of an object of interest within the source image is unknown). As another example, the search area position location for the source image may be determined as the center of a portion of source image 120 in which an object of interest in template image 110 is expected to appear or was last determined to have appeared, such as to optimize searching for the template image within the source image when information regarding an expected or likely location of the object of interest is known. Irrespective of the particular basis for calculating or otherwise identifying the search area position location for the source image, search range 500 of embodiments is preferably centered (e.g., center (Cx, Cy) disposed) at that location for defining a searching area utilized in iterative multi-directional searching.

Rather than searching within the entire area of the search range, embodiments of the present invention provide for searching within the reduced area of a searching area defined as a sub-portion of the search range. For example, logic of processor-based system 300 may utilize the search range information along with other iterative multi-directional searching information, such as template image size information and multi-directional searching pattern information, for defining one or more searching areas within source image 120 that are configured for image searching in each direction of the multiple searching directions. A searching area of embodiments provides a searching area within a source image for searching for a template image in the multiple directions of the multi-directional searching pattern. As an example, an embodiment may utilize one or more cross searching pattern to identify a cross searching area, such as may comprise a first directional search portion (e.g., horizontal search portion) and a second search portion (e.g., vertical search portion) which cross one another.

Figure 5:
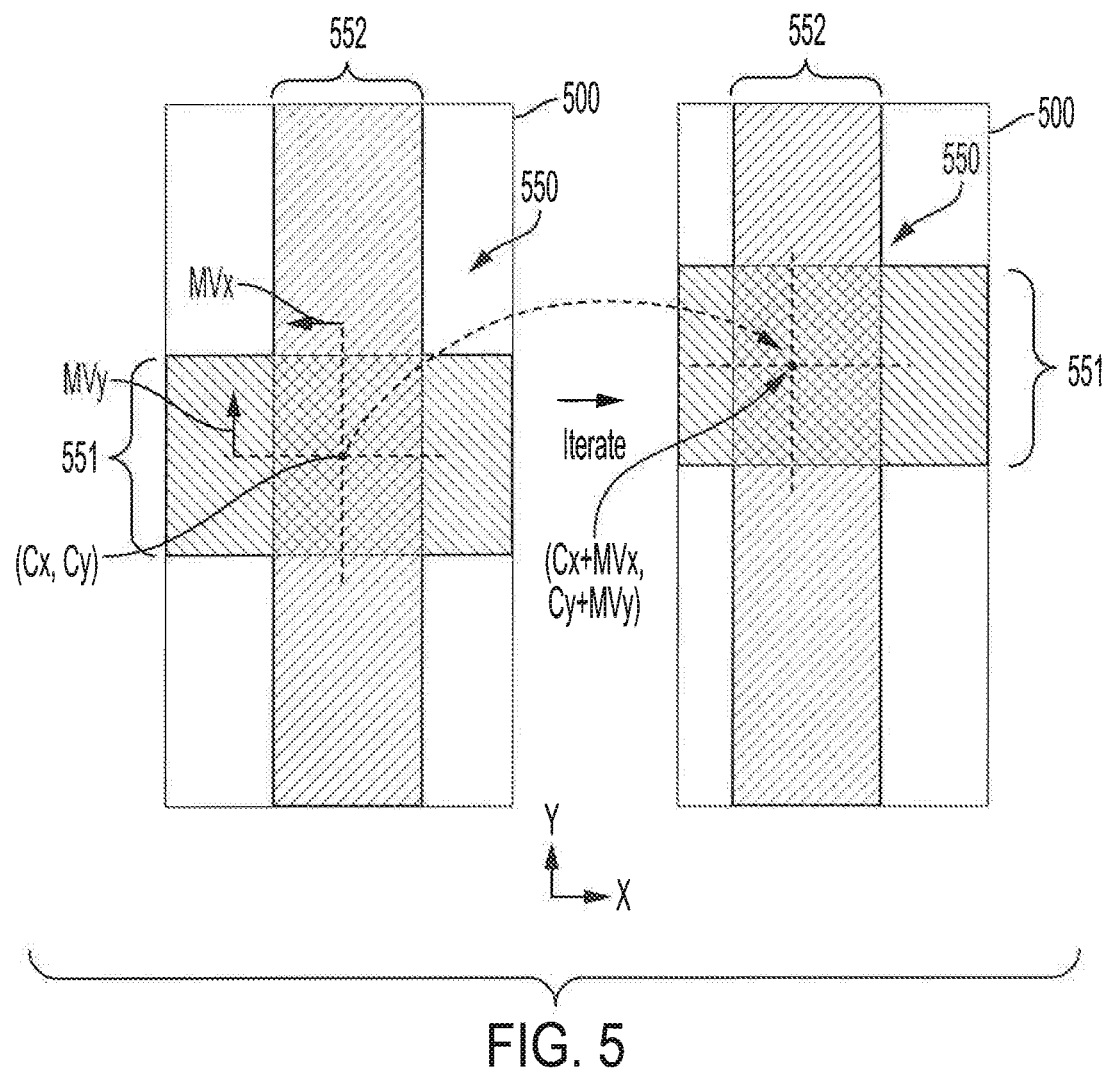
FIG. 5 shows examples of a searching area provided with respect to a search range of iterative multi-directional image searching operation according to embodiments of the present invention.

An example of a cross searching area implementation of searching area 550 defined in accordance with a cross searching pattern is shown in FIG. 5. Searching area 550 may, for example, be defined by defining horizontal rectangle 551 as having a length corresponding to the width of search range 500 and a width corresponding to the height of template image 110, and by defining vertical rectangle 552 as having a length corresponding to the height of search range 500 and a width corresponding to the width of template image 110. An initial iteration of searching area 550 is defined from the areas of horizontal rectangle 551 and vertical rectangle 552 disposed within search range 500 to cross at center (Cx, Cy) (e.g., horizontal rectangle 551 is centered vertically on Cy and vertical rectangle 552 is centered horizontally on Cx), as shown in the left half of FIG. 5.

Figure 6:
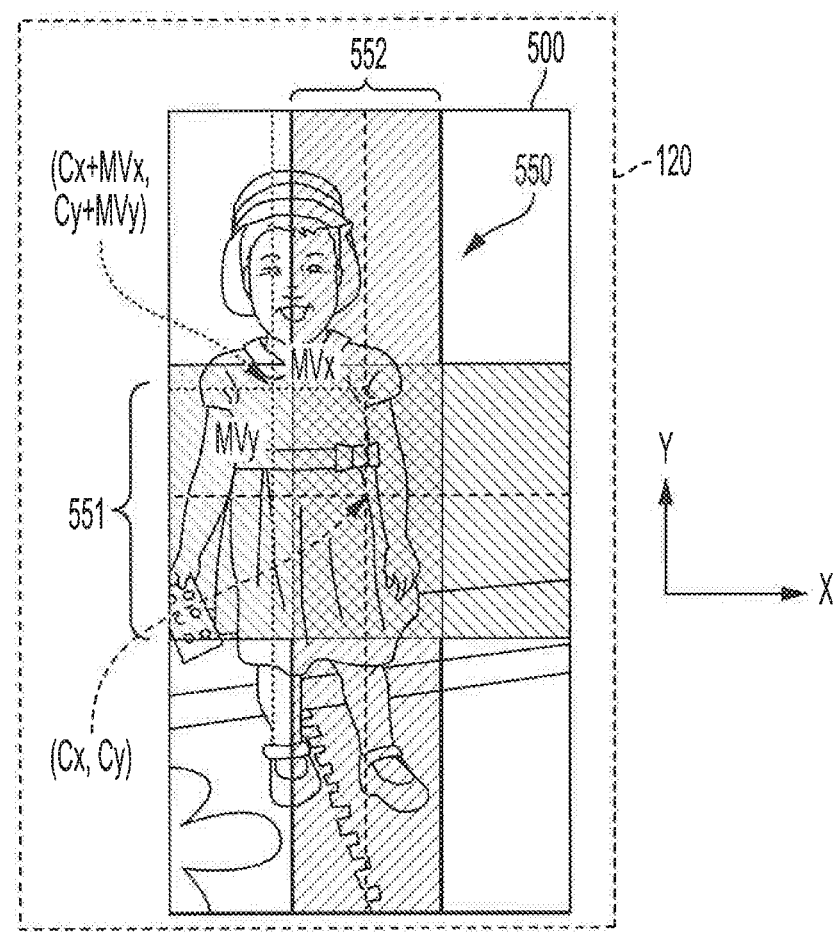
FIG. 6 shows an example of a searching area defined in the source image in iterative multi-directional image searching operation according to embodiments of the present invention.

The initial iteration of searching area 550 of embodiments corresponds to a particular portion of source image 120 to be searched. For example, as discussed above, center (Cx, Cy) may be disposed at a search area position location for source image 120, as shown in FIG. 6. To facilitate searching within the source image using the above mentioned 1D representations of template image 110, operation at block 203 of flow 200 illustrated in FIG. 2 operates to transform searching area 550 of source image 120 to 1D representations corresponding to each direction of the multi-directional image search. For example, image data for multi-directional image searching area 550 within source image 120 may be transformed from the 2D domain to 1D representations using summation (e.g., summation of median or average pixels along a direction of the multi-directional search), FFT (e.g., discrete Fourier transform of pixels along a direction of the multi-directional search), or other transformation techniques for representing the image data 1-dimensionally (e.g., 1D vector).

Figure 7:
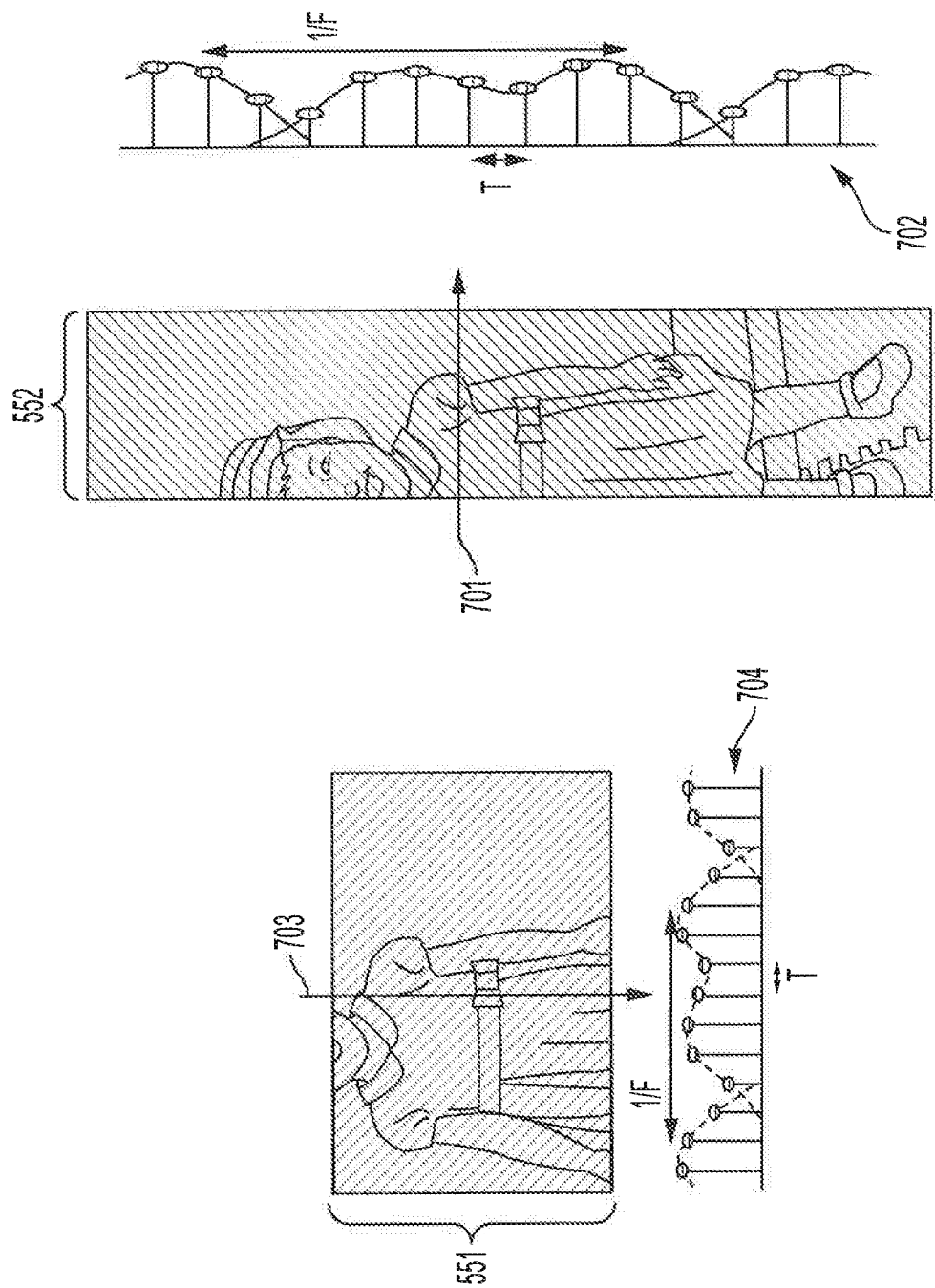
FIGS. 7A and 7B show examples of generation of 1D representations of the searching area of the source image where the multi-directional search comprises horizontal and vertical directions.

FIG. 6 continues with the above example in which the multi-directional search comprises horizontal and vertical directions. In this exemplary embodiment, transforming searching area 550 of source image 120 to a 1D representation for the horizontal direction (e.g., a first direction of the multi-directional search) may comprise applying a transformation technique (e.g., summation, FFT, etc.) to each pixel of a horizontal row of pixels in vertical rectangle 552 of searching area 550. The transformation technique may be likewise applied with respect to each row of pixels forming the vertical rectangle (as represented by arrow 701 of FIG. 7A sequentially traversing each row of pixels) and the combined result (e.g., a horizontal pixel 1D vector derived from the horizontal pixel row data, such as shown in graph 702 having a data point (e.g., magnitude) for each horizontal row of pixels in the vertical rectangle) used for representing the image data 1-dimensionally. Similarly, transforming searching area 550 of source image 120 to a 1D representation for the vertical direction (e.g., a second direction of the multi-directional search) may comprise applying a transformation technique (e.g., summation, FFT, etc.) to each pixel of a vertical column of pixels in the horizontal rectangle 551. The transformation technique may be likewise applied with respect to each column of pixels forming the horizontal rectangle (as represented by arrow 703 of FIG. 7B sequentially traversing each column of pixels) and the combined result (e.g., a vertical pixel 1D vector derived from the vertical pixel column data, such as shown in graph 704 having a data point (e.g., magnitude) for each vertical column of pixels in the horizontal rectangle) used for representing the image data 1-dimensionally. In the illustrated example, the horizontal/vertical pixel 1D vectors comprise a vector having information (e.g., summation of median or average pixel values, FFT of the pixels, etc.) for each row/column of the searching area of source image 120.

At block 204 of the illustrated embodiment of flow 200, the multi-directional 1D representations of template image 110 and the multi-directional 1D representations of searching area 550 are used to iteratively search for template image 110 in source image 120. In iterative multi-directional image searching operation according to embodiments, as described further below, searching for template image 110 is performed in searching area 550 of source image 120 along the multiple directions of the multi-directional searching pattern by correlating the appropriate 1D representations of the template image (e.g., template image horizontal pixel 1D vector and template image vertical pixel 1D vector derived at block 202) and the 1D representations of the searching area within the source image (e.g., searching area horizontal pixel 1D vector and searching area vertical pixel 1D vector initially derived at block 203, and as may be re-derived in iterations of block 204). Also as described further below, a location of searching area 550 within source image 120 may be updated iteratively, such as based upon motion vectors derived from the searching, until a matching position for template image 110 is identified within source image 120.

Figure 8:
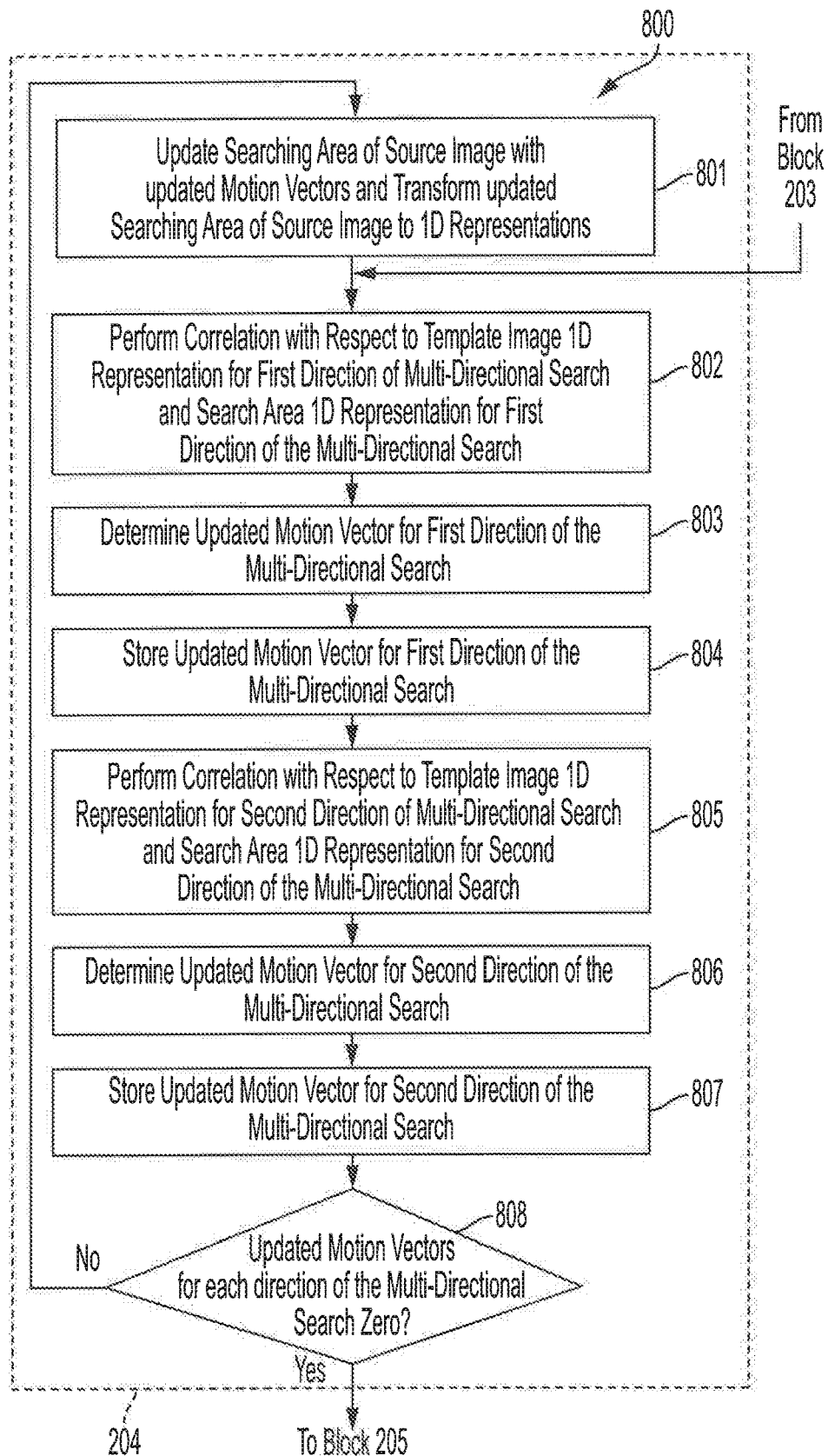
FIG. 8 shows a flow diagram of iterative multi-directional image searching operation according to embodiments of the present invention.

FIG. 8 shows flow 800 providing iterative multi-directional image searching operation as may be implemented at block 204 of flow 200 according to embodiments of the invention. In the illustrated embodiment, flow 800 is entered after template image 1D representations (e.g., block 202) and initial searching area 1D representations (e.g., block 203) have been generated. Accordingly, the first iteration of flow 800 is shown as beginning at block 802, thus initially omitting updating of the searching area of the source image and generating updated searching area 1D representations, as provided at block 801. Such updating may, as described in detail with respect to embodiments below, be provided based upon motion vector information which may not yet be available in a first iteration of the iterative multi-directional image searching operation of flow 800 (e.g., motion vector is initially set as zero). If, however, such motion vector information is available or the initial searching area and associated 1D representations are otherwise to be updated in a first iteration of the iterative multi-directional image searching operation, flow 800 may be entered at block 801 for such update processing (described below).

At block 802 of flow 800 shown in FIG. 8, correlation is performed with respect to the template image 1D representation for a first direction (e.g., horizontal) of the multi-directional search (e.g., template image horizontal pixel 1D vector) and searching area 1D representation for the first direction of the multi-directional search (e.g., searching area horizontal pixel 1D vector). For example, logic of processor-based system 300 may perform cross-correlation of template image horizontal pixel 1D vector and a searching area horizontal pixel 1D vector for the current searching area within the source image. The correlation performed according to embodiments identifies a best match of the template image 1D representation for the first direction (e.g., template image horizontal pixel 1D vector) within the searching area 1D representation for the first direction (e.g., searching area horizontal pixel 1D vector). The correlation criteria used for identifying a best match may, for example, be sum of absolute differences (SAD), mean absolute error (MAE), mean squared error (MSE), and/or other techniques which can be used to select the most similar vector. Accordingly, location information for this best match of the template image along the axis (e.g., X axis) of the first direction may be derived from the correlation. The location information may, for example, identify a center location (CUx) along the X axis of the template image horizontal pixel 1D vector best match within the searching area horizontal pixel 1D vector.

Motion vector information for the first direction of the multi-dimensional search is determined at block 803 of the illustrated embodiment. For example, logic of processor-based system 300 may analyze the correlation performed with respect to the template image 1D representation for the first direction of the multi-directional search and the searching area 1D representation for the first direction of the multi-directional search to determine a first direction motion vector (e.g., MVx). The first direction motion vector, MVx, may provide information regarding the current estimation of motion along the axis (e.g., X axis) of the first direction from center (Cx, Cy), as illustrated in FIGS. 5 and 6. For example, the motion vector MVx may be determined as a difference between a current search area center on the X axis (Cx) and the center location (CUx) for the template image horizontal pixel 1D vector best match along the X axis (e.g., MVx=Cx−CUx). At block 804 of the illustrated embodiment of flow 800, the motion vector information (e.g., MVx) is stored for later analysis and/or use in updating the searching area of the source image.

At block 805 of flow 800 shown in FIG. 8, correlation is performed with respect to the template image 1D representation for a second direction (e.g., vertical) of the multi-directional search (e.g., template image vertical pixel 1D vector) and searching area 1D representation for the second direction of the multi-directional search (e.g., searching area vertical pixel 1D vector). For example, logic of processor-based system 300 may perform cross-correlation of template image vertical pixel 1D vector and a searching area vertical pixel 1D vector for the current searching area within the source image. The correlation performed according to embodiments identifies a best match of the template image 1D representation for the second direction (e.g., template image vertical pixel 1D vector) within the searching area 1D representation for the second direction (e.g., searching area vertical pixel 1D vector). Accordingly, location information for this best match of the template image along the axis (e.g., Y axis) of the second direction may be derived from the correlation. The location information may, for example, identify a center location (CUy) along the Y axis of the template image vertical pixel 1D vector best match within the searching area vertical pixel 1D vector.

Motion vector information for the second direction of the multi-dimensional search is determined at block 806 of the illustrated embodiment. For example, logic of processor-based system 300 may analyze the correlation performed with respect to the template image 1D representation for the second direction of the multi-directional search and the searching area 1D representation for the second direction of the multi-directional search to determine a second direction motion vector (e.g., MVy). The second direction motion vector, MVy, may provide information regarding the current estimation of motion along the axis (e.g., Y axis) of the second direction from center (Cx, Cy), as illustrated in FIGS. 5 and 6. For example, the motion vector MVy may be determined as a difference between a current search area center on the Y axis (Cy) and the center location (CUy) for the template image vertical pixel 1D vector best match along the Y axis (e.g., MVy=Cy−CUy). At block 807 of the illustrated embodiment of flow 800, the motion vector information (e.g., MVy) is stored for later analysis and/or use in updating the searching area of the source image.

At block 808 of the illustrated embodiment of flow 800, the motion vector information (e.g., MVx and MVy) is analyzed to determine if movement of the template image with respect to the source image is indicated. For example, if the center location of the template image is the same as the previous center location, then it may be determined that the template image has converged on the corresponding portion of the source image. In operation according to embodiments if each motion vector for the multi-directional search are zero, no movement of the template image with respect to the source image was detected in the present iteration of the multi-directional search, indicating that the template image has converged on the corresponding location within the source image. If the analysis of the motion vector information indicates no movement of the template image with respect to the source image (i.e., the location of the template image has been identified based upon the correlation of 1D representations), the illustrated embodiment exits flow 800 (e.g., continuing with flow 200 of FIG. 2). However, if the analysis of the motion vector information indicates that there is movement of the template image with respect to the source image (i.e., the location of the template image has not been identified and further iterative multi-directional image searching operation is to be performed), processing according to the illustrated embodiment proceeds to block 801.

At block 801 of flow 800 of the illustrated embodiment, the searching area of the source image is updated and corresponding updated searching area 1D representations are generated. For example, logic of processor-based system 300 may update the searching area based upon the motion vector information determined in the current iteration of the iterative multi-directional image searching operation. As an example, updated center (Cx, Cy) may be determined from adding the motion vectors to the current center location (e.g., (Cx+MVx, Cy+MVy)), as illustrated in FIGS. 5 and 6. Updated searching area 550 of the source image 120 may thus be defined from the areas of horizontal rectangle 551 and vertical rectangle 552 disposed within search range 500 to cross at the updated center (Cx, Cy) (e.g., (Cx+MVx, Cy+MVy) whereby horizontal rectangle 551 is recentered vertically on Cy+MVy and vertical rectangle 552 is recentered horizontally on Cx+MVx)), as shown in the right half of FIG. 5. Updated center (Cx, Cy) is disposed at a search area position location for source image 120 suggested by the motion vector information, as shown in FIG. 6. To facilitate searching within the source image using the above mentioned 1D representations of template image 110, operation at block 801 of flow 800 illustrated in FIG. 8 operates to transform updated searching area 550 of source image 120 to 1D representations corresponding to each direction of the multi-directional image search. For example, image data for updated multi-directional image searching area 550 within source image 120 may be transformed from the 2D domain to 1D representations using summation (e.g., summation of median or average pixels along a direction of the multi-directional search), FFT (e.g., discrete Fourier transform of pixels along a direction of the multi-directional search), or other transformation techniques for representing the image data 1-dimensionally (e.g., 1D vector), as discussed above with respect to the initial multi-directional search area (block 203).

Figure 9:
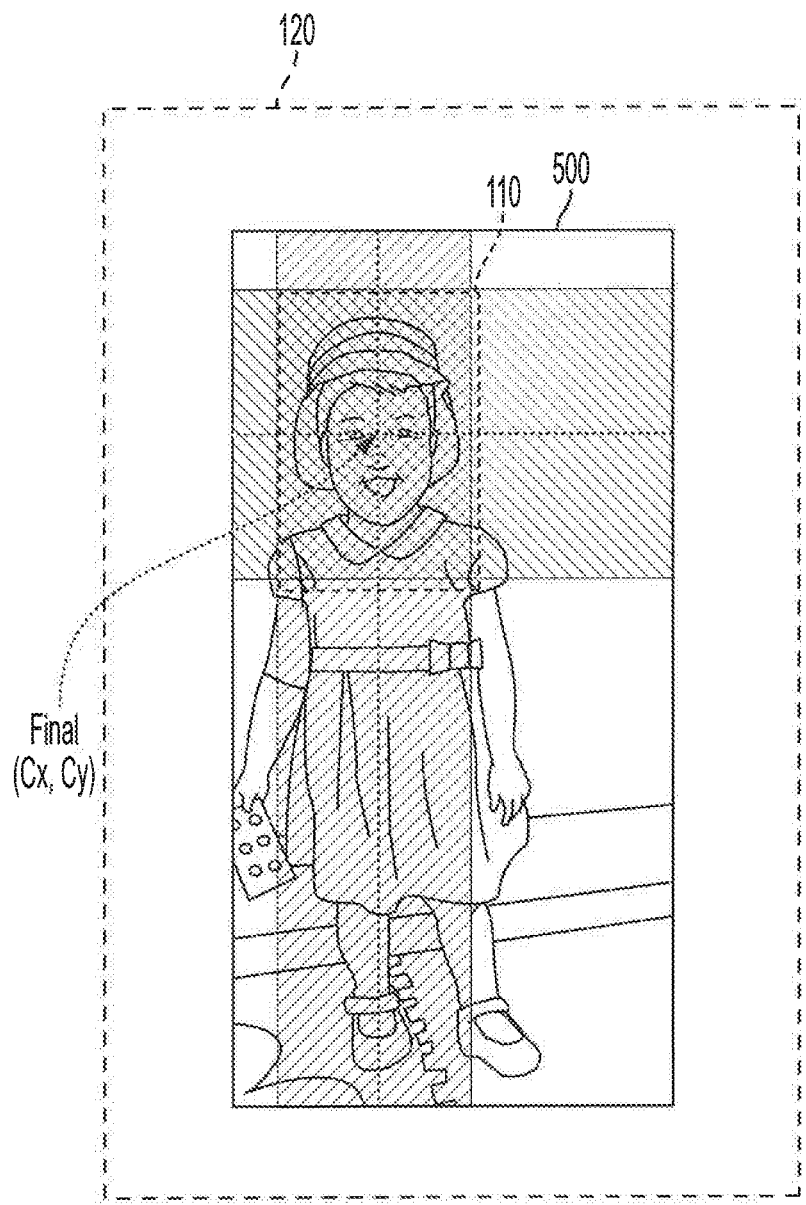
FIG. 9 shows example location position information for a determined position of the template image within the source image as may be provided by iterative multi-directional image searching of embodiments of the present invention.

Having updated the searching area and generated corresponding updated searching area 1D representations, processing according to the illustrated embodiment proceeds with another iteration of flow 800. Accordingly, the iterative multi-directional image searching operation of flow 800 may iterate until the location of template image 110 is identified within source image 120. Upon identifying the location of the template image within the source image (e.g., an affirmative determination at block 804 or 807 providing a final center (Cx, Cy) within source image 120 for template image 110 as shown in FIG. 9), processing according to the illustrated embodiment proceeds to block 205 of flow 200.

It should be appreciated that although flow 800 of the exemplary embodiment of FIG. 8 provides for iterative multi-directional image searching operation with respect to first (e.g., horizontal) and second (vertical) searching directions, the flow may be readily scaled for accommodating a larger number of searching directions of a multi-directional image search. For example, blocks for a third (e.g., depth) searching direction may be added, such as for configuring the multi-directional image searching for 3D source images.

Referring again to FIG. 2, at block 205 of the illustrated embodiment of flow 200, information regarding pattern matching identified by the iterative multi-directional image searching is output. For example, location position information 221, such as may comprise final center (Cx, Cy), for the template image as identified in the source image may be output. It should be appreciated that location position information 221 of embodiments may include information in addition to or in the alternative to the aforementioned final center location. For example, location position information 221 may comprise motion vector information (e.g., one or more motion vectors indicative of the movement or rate of movement of the template image, such as to provide information regarding movement from an initial search area position, movement with respect to a previous source image, etc.). Such information may, for example, be utilized for quality control, defect inspection, motion estimation, image registration, object localization, stereo matching, autonomous vehicle navigation, etc.

Comparison of template image searching within source images using iterative multi-directional image searching of an embodiment implemented in accordance with flow 200 discussed above with template image searching using conventional techniques, such as those implementing a full search and a hexagon, shows that the iterative multi-directional image searching technique generally identifies the target image more quickly. The table below shows the time required for template image searching using the full search, hexagon, and iterative multi-directional image searching techniques.

| | Method | | |
|---|---|---|---|
| | Full Search | Hexagon | Iterative Multi-Directional Image Searching |
| Time (sec) | 7 | 2 | 1 |

It can be appreciated from the foregoing that embodiments of iterative multi-directional image searching provide relatively fast searching of source images for template images. Moreover, implementations of iterative multi-directional image searching of embodiments utilize less computing resources, such as memory and processing capacity, than conventional techniques, such as due to the multi-directional searching facilitating use of a sub-portion of the search range, searching based upon efficient use of 1D representations of the template images and source images, etc. The iterative multi-directional image searching of embodiments is particularly well suited for large template matching, although any scale of template image is accommodated. As a further advantage, iterative multi-directional image searching of embodiments accommodate detection of template images in source images even where rotation and scale variance of the subject (e.g., object of interest) of the template image is experienced. Iterative multi-directional image searching of embodiments may be provided in software implementations, hardware implementations, as well as combinations thereof.

Figure 10:
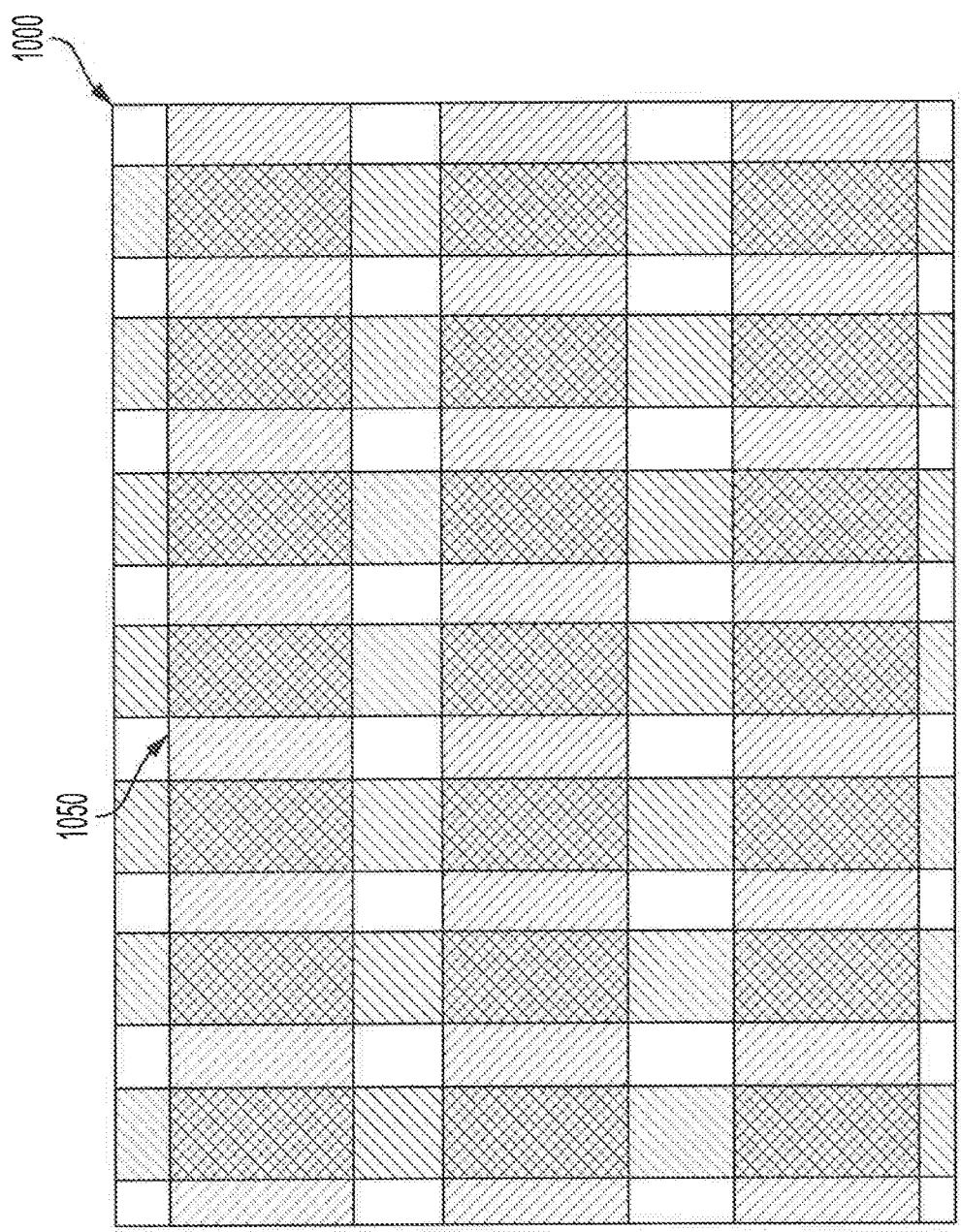
FIG. 10 shows an example multi-directional searching pattern as may be utilized by iterative multi-directional image searching according to embodiments of the present invention.

It should be appreciated that the exemplary embodiments described above have been provided to aid in the understanding of the present invention and that the concepts of the present invention are applicable to other implementations. For example, although embodiments have been discussed with respect to the multi-directional image searching being configured for first (e.g., horizontal) and second (vertical) search directions, the concepts herein may be applied to more search directions (e.g., 3, 4, etc.) and/or search directions other than horizontal and vertical (e.g., left diagonal, right diagonal, depth, etc.). Likewise, although embodiments have been discussed with reference to a multi-directional searching pattern comprising a cross searching pattern, the concepts herein may be applied to different searching pattern configurations and/or having more or fewer crossings (e.g., multiple crossings searching pattern). As an example, FIG. 10 shows an example of searching area 1050, comprising a searching pattern having multiple crossings, defined in search range 1000. The multiple crossing configuration of searching area 1050 is particularly well suited for use where the search range is large.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A method for template image matching within a source image, the method comprising:
    transforming the template image to multiple 1-dimensional (1D) template representations corresponding to multiple image searching directions of a multi-directional search;
    defining a searching area within the source image for searching for the template image in the multiple image searching directions, wherein the searching area is a sub-portion of a search range and is configured for image searching in each direction of the multiple searching directions;
    transforming the searching area of the source image to multiple 1D source representations corresponding to the multiple image searching directions;
    performing correlations between 1D template representations of the multiple 1D template representations for each direction of the multiple image searching directions and 1D source representations of the multiple 1D source representations for each corresponding direction of the multiple image searching directions;
    analyzing the correlations between the 1D template representations and the 1D source representations to determine if matching of the template image within the source image is indicated;
    outputting matched pattern information for the template image if matching of the template image within the source image is indicated; and
    iteratively performing the multi-directional search within the search range using the 1D template representations of the multiple 1D template representations if matching of the template image within the source image is not indicated, wherein the iteratively performing the multi-directional search comprises:
        repositioning the searching area within the search range in the source image, wherein the repositioning the searching area within the search range in the source image is based on motion vectors for each direction of the multiple searching directions derived from the analyzing the correlations between the 1D template representations of the multiple 1D template representations for each direction of the multiple image searching directions and the 1D source representations of the multiple 1D source representations for each corresponding direction of the multiple image searching directions; and
        performing another iteration of the transforming the searching area of the source image to another iteration of multiple 1D source representations, performing correlations between the 1D template representations of the multiple 1D template representations and another iteration of 1D source representations of the another iteration of multiple 1D source representations of the repositioned searching area of the source image, and analyzing the correlations between the 1D template representations of the multiple 1D template representations and the another iteration of 1D source representations of the multiple 1D source representations of the repositioned searching area of the source image.

2. The method of claim 1, wherein the multiple image searching directions comprise a first direction of the multi-directional search and a second direction of the multi-directional search, and wherein the transforming the template image to h multiple 1D template representations comprises:
    transforming the template image to a first direction template image pixel 1D vector for the first direction of the multi-directional search; and
    transforming the template image to a second direction template image pixel 1D vector for the second direction of the multi-directional search.

3. The method of claim 2, wherein the transforming the searching area of the source image to h multiple 1D source representations comprises:
    transforming the searching area of the source image to a first direction source image pixel 1D vector for the first direction of the multi-directional search; and
    transforming the searching area of the source image to a second direction source image pixel 1D vector for the second direction of the multi-directional search.

4. The method of claim 3, wherein the first direction of the multi-directional search and the second direction of the multi-directional search are orthogonal.

5. The method of claim 4, wherein the first direction of the multi-directional search is a horizontal direction and the second direction of the multi-directional search is a vertical direction.

6. The method of claim 4, wherein the searching area comprises a first directional search portion corresponding to the first direction of the multi-directional search and a second directional search portion corresponding to the second direction of the multi-directional search, wherein the first directional search portion and the second directional search portion cross one another.

7. The method of claim 4, wherein the searching area comprises a plurality of first directional search portions corresponding to the first direction of the multi-directional search and a plurality of second directional search portions corresponding to the second direction of the multi-directional search, wherein each first directional search portion of the plurality of first directional search portions crosses at least one second directional search portion of the plurality of second directional search portions.

8. The method of claim 1, further comprising:
rotating the template image to provide multiple instances of the template image, wherein one or more of the multiple instances of the template image provide rotation variance of a subject of the template image, wherein the transforming the template image to h multiple 1D template representations corresponding to multiple image searching directions comprises:
transforming each of the multiple instances of the template image to a plurality of 1D template representations of the multiple 1D template representations corresponding to the multiple image searching directions for determining if matching of the template image within the source image is indicated when rotation variance of the subject of the template image is experienced.

9. The method of claim 1, further comprising:
scaling the template image to provide multiple instances of the template image, wherein one or more of the multiple instances of the template image provide scale variance of a subject of the template image, wherein the transforming the template image to multiple 1D template representations corresponding to multiple image searching directions comprises:
transforming each of the multiple instances of the template image to a plurality of 1D template representations of the multiple 1D template representations corresponding to the multiple image searching directions for determining if matching of the template image within the source image is indicated when scale variance of the subject of the template image is experienced.

10. The method of claim 1, wherein the repositioning the searching area within the source image comprises:
moving a first directional search portion of the searching area corresponding to a first direction of the multi-directional search based on a second motion vector for a second direction of the multiple searching directions; and
moving a second directional search portion of the searching area corresponding to the second direction of the multi-directional search based on a first motion vector for the first direction of the multiple searching directions.

11. The method of claim 1, wherein the correlations comprise cross-correlations.

12. The method of claim 1, wherein a correlation criteria used for the correlations is selected from the group consisting of:
sum of absolute differences (SAD);
mean absolute error (MAE); and
mean squared error (MSE).

13. The method of claim 1, wherein the template image has a width or height that is at least ⅓ of the search range and thus the template image matching is a large template situation.

14. A system for template image matching within a source image, the system comprising:
at least one processor; and
a memory coupled to the at least one processor, wherein the at least one processor is configured:
to transform the template image to multiple 1-dimensional (1D) template representations corresponding to multiple image searching directions of a multi-directional search;
to define a searching area within the source image for searching for the template image in the multiple image searching directions, wherein the searching area is a sub-portion of a search range and is configured for image searching in each direction of the multiple searching directions;
to transform the searching area of the source image to multiple 1D source representations corresponding to the multiple image searching directions;
to perform correlations between 1D template representations of the multiple 1D template representations for each direction of the multiple image searching directions and 1D source representations of the multiple 1D source representations for each corresponding direction of the multiple image searching directions;
to analyze the correlations between the 1D template representations of the multiple 1D template representations and the 1D source representations of the multiple 1D source representations to determine if matching of the template image within the source image is indicated;
to output matched pattern information for the template image if matching of the template image within the source image is indicated; and
to iteratively perform the multi-directional search within the search range using the 1D template representations of the multiple 1D template representations if matching of the template image within the source image is not indicated, wherein the at least one processor configured to iteratively perform multi-directional image searching is configured:
to reposition the searching area within the search range in the source image, wherein the repositioning the searching area within the search range in the source image is based on motion vectors for each direction of the multiple searching directions derived from analyzing the correlations between the 1D template representations of the multiple 1D template representations for each direction of the multiple image searching directions and the 1D source representations of the multiple 1D source representations for each corresponding direction of the multiple image searching directions; and
to perform another iteration of transforming the searching area of the source image to another iteration of multiple 1D source representations, performing correlations between the 1D template representations of the multiple 1D template representations and another iteration of 1D source representations of the another iteration of multiple 1D source representations of the repositioned searching area of the source image, and analyzing the correlations between the 1D template representations of the multiple 1D template representations and the another iteration of 1D source representations of the another iteration of multiple 1D source representations of the repositioned searching area of the source image.

15. The system of claim 14, wherein the multiple image searching directions comprise a first direction of the multi-directional search and a second direction of the multi-directional search, and wherein the at least one processor is further configured:

to transform the template image to a first direction template image pixel 1D vector for the first direction of the multi-directional search;
to transform the template image to a second direction template image pixel 1D vector for the second direction of the multi-directional search;
to transform the searching area of the source image to a first direction source image pixel 1D vector for the first direction of the multi-directional search; and
to transform the searching area of the source image to a second direction source image pixel 1D vector for the second direction of the multi-directional search.

16. The system of claim 14, wherein the searching area comprises a first directional search portion corresponding to the first direction of the multi-directional search and a second directional search portion corresponding to the second direction of the multi-directional search, wherein the first directional search portion and the second directional search portion cross one another.

17. The system of claim 14, wherein the at least one processor is further configured:
to rotate the template image to provide multiple instances of the template image, wherein one or more of the multiple instances of the template image provide rotation variance of a subject of the template image; and
to transform each of the multiple instances of the template image to a plurality of 1D template representations of the multiple 1D template representations corresponding to the multiple image searching directions for determining if matching of the template image within the source image is indicated when rotation variance of the subject of the template image is experienced.

18. The system of claim 14, wherein the at least one processor is further configured:
to scale the template image to provide multiple instances of the template image, wherein one or more of the multiple instances of the template image provide scale variance of a subject of the template image; and
to transform each of the multiple instances of the template image to a plurality of 1D template representations of the multiple 1D template representations corresponding to the multiple image searching directions for determining if matching of the template image within the source image is indicated when scale variance of the subject of the template image is experienced.

19. The system of claim 14, wherein the at least one processor configured to reposition the searching area within the source image is configured:
to move a first directional search portion of the searching area corresponding to a first direction of the multi-directional search based on a second motion vector for a second direction of the multiple searching directions; and
to move a second directional search portion of the searching area corresponding to the second direction of the multi-directional search based on a first motion vector for the first direction of the multiple searching directions.

20. A method for template image matching within a source image, the method comprising:
transforming the template image to a horizontal template image pixel 1-dimensional (1D) vector and a vertical template image pixel 1D vector for multi-directional image searching within the source image;
defining, utilizing search range information and multi-directional searching pattern information, a searching area within the source image for searching for the template image in horizontal and vertical searching directions of a cross search pattern of the multi-directional searching pattern information, wherein the searching area is a reduced area of a search range of the search range information and comprises a horizontal search portion forming a horizontal rectangle corresponding to the horizontal searching direction of the cross search pattern and a vertical search portion forming a vertical rectangle corresponding to the vertical searching direction of the cross search pattern, wherein the horizontal rectangle of the horizontal search portion and the vertical rectangle of the vertical search portion cross one another;
transforming the searching area of the source image to a horizontal source image pixel 1D vector and a vertical source image pixel 1D vector for the multi-directional image searching;
performing a correlation between the horizontal template image pixel 1D vector and the horizontal source image pixel 1D vector;
performing a correlation between the vertical template image pixel 1D vector and the vertical source image pixel 1D vector;
analyzing the correlations to determine if matching of the template image within the source image is indicated; and
outputting matched pattern information for the template image if matching of the template image within the source image is indicated.

21. The method of claim 20, further comprising:
rotating the template image to provide multiple instances of the template image, wherein one or more of the multiple instances of the template image provide rotation variance of a subject of the template image; and
transforming each of the multiple instances of the template image to a respective horizontal template image pixel 1D vector and a respective vertical template image pixel 1D vector for determining if matching of the template image within the source image is indicated when rotation variance of the subject of the template image is experienced.

22. The method of claim 20, further comprising:
scaling the template image to provide multiple instances of the template image, wherein one or more of the multiple instances of the template image provide scale variance of a subject of the template image; and
transforming each of the multiple instances of the template image to a respective horizontal template image pixel 1D vector and a respective vertical template image pixel 1D vector for determining if matching of the template image within the source image is indicated when scale variance of the subject of the template image is experienced.

23. The method of claim 20, further comprising:
iteratively performing the multi-directional image searching within the search range using a horizontal template image pixel 1D vector and the vertical template image pixel 1D vector if matching of the template image within the source image is not indicated.

24. The method of claim 23, wherein the iteratively performing the multi-directional image searching comprises:
repositioning the searching area within the search range in the source image; and
performing another iteration of the transforming the repositioned searching area of the source image to a horizontal source image pixel 1D vector of the repositioned searching area of the source image and a vertical source image pixel 1D vector of the repositioned searching area of the source image, performing correlation between the horizontal template image pixel 1D vector and the horizontal source image pixel 1D vector of the repositioned searching area of the source image, performing correlation between the vertical template image pixel 1D vector and the vertical source image pixel 1D vector of the repositioned searching area of the source image, and analyzing the correlations between the horizontal template image pixel 1D vector and the horizontal source image pixel 1D vector of the repositioned searching area of the source image and between the vertical template image pixel 1D vector and the vertical source image pixel 1D vector of the repositioned searching area of the source image.

25. The method of claim 24, wherein the repositioning the searching area within the search range in the source image is based on horizontal and vertical motion vectors derived from the analyzing the correlations between the horizontal template image pixel 1D vector and the horizontal source image pixel 1D vector and the vertical template image pixel 1D vector and the vertical source image pixel 1D vector.

26. The method of claim 25, wherein the repositioning the searching area within the source image comprises:
   moving the horizontal search portion based on a vertical motion vector; and
   moving the vertical search portion based on a horizontal motion vector.

27. The method of claim 20, wherein the correlations comprise cross-correlations.

\* \* \* \* \*

UNITED STATES PATENT AND TRADEMARK OFFICE
CERTIFICATE OF CORRECTION

PATENT NO. : 11,210,551 B2  
APPLICATION NO. : 16/524802  
DATED : December 28, 2021  
INVENTOR(S) : Tian Qiu Page 1 of 1

It is certified that error appears in the above-identified patent and that said Letters Patent is hereby corrected as shown below:

In the Specification

At Column 5, Line number 28, delete "Intel. Corporation" and replace with --Intel Corporation--.
At Column 5, Line number 29, delete "Advanced. Micro" and replace with --Advanced Micro--.
At Column 7, Line number 39, delete "31.5°" and replace with --315°--.

In the Claims

At Column 16, Claim number 2, Line number 34, delete "to h multiple" and replace with --to the multiple--.
At Column 16, Claim number 3, Line number 43, delete "to h multiple" and replace with --to the multiple--.
At Column 17, Claim number 8, starting at Line number 12, delete "to h multiple" and replace with --to the multiple--.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*